Figure 1:
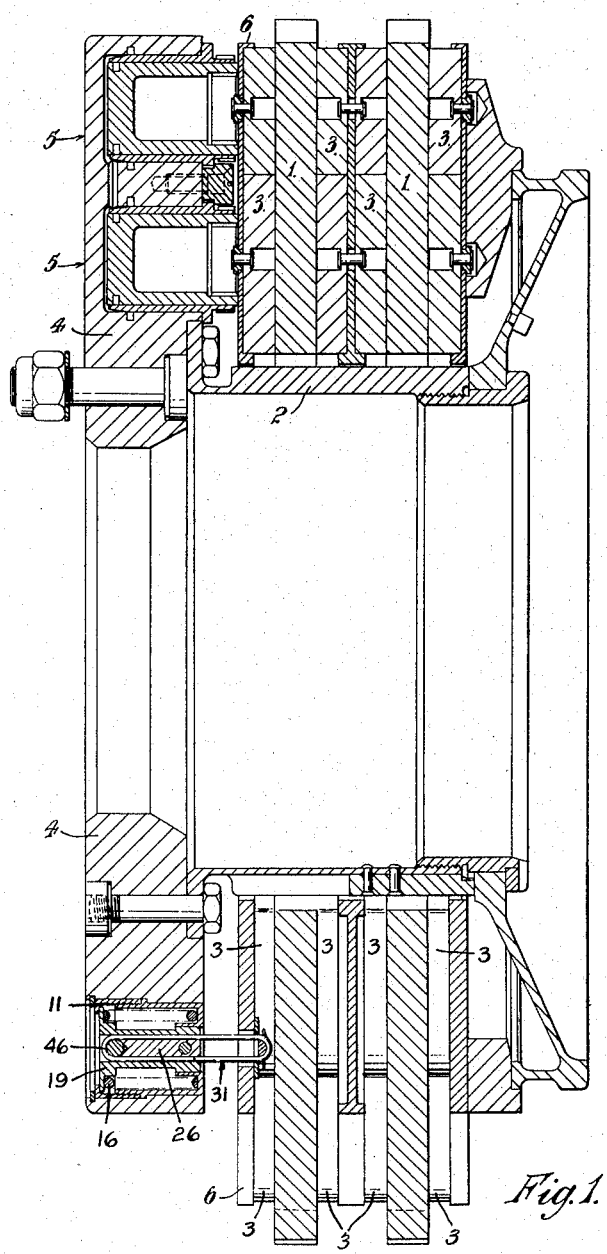

May 12, 1959  H. W. TREVASKIS  2,886,140
AUTOMATIC ADJUSTING DEVICE
Filed Aug. 14, 1956  4 Sheets-Sheet 2

INVENTOR
Henry William Trevaskis
by Benj. T. Rauber
his attorney

May 12, 1959　　　　H. W. TREVASKIS　　　　2,886,140
AUTOMATIC ADJUSTING DEVICE

Filed Aug. 14, 1956　　　　　　　　　　　　　　4 Sheets-Sheet 4

INVENTOR
Henry William Trevaskis
by Benj. T. Rauber
his attorney

United States Patent Office 2,886,140
Patented May 12, 1959

2,886,140

AUTOMATIC ADJUSTING DEVICE

Henry William Trevaskis, Solihull, England, assignor to Dunlop Rubber Company Limited, London County, England, a British company Application August 14, 1956, Serial No. 603,983

Claims priority, application Great Britain August 20, 1955

22 Claims. (Cl. 188—72)

This invention relates to an automatic adjusting device, and more particularly relates to a device for automatically adjusting brakes, clutches and like mechanisms.

Disc brakes, for example, for aircraft, or other vehicles or machinery, may comprise one or more axially spaced and rotatable discs engaging with a wheel and non-rotatable axially-movable pads of friction material axially aligned on each side of the discs. A fluid-pressure operated mechanism is usually employed to force the assembly of discs and pads together into frictional engagement, thereby decelerating the discs and the wheel which they engage, and spring means are used to disengage the assembly when the brake is idle, and provide a running clearance between the pads and discs. As pad wear takes place this running clearance progressively increases so that, after some use of a disc brake, a considerable clearance must first be overcome before the brake can be applied, thus preventing its rapid application. A further disadvantage is the objectionably large fluid displacement required.

Automatic adjustment devices have been proposed to overcome this disadvantage and said devices may comprise, for example, a friction device, that is, a block of rubber or the like frictionally engaging a pin, or alternatively a spring-loaded pawl and ratchet device or a device incorporating cam means. None of these devices have proved entirely satisfactory, particularly when applied to the brakes of modern aircraft.

The object of the present invention is to provide an improved type of automatic adjusting device for brakes, clutches and like mechanisms.

According to the present invention an automatic adjusting device for a brake, clutch or like mechanism having two members relatively movable to effect engagement thereof comprises a deformable metallic element connecting said members and having a portion bent or looped around one of said members in such a manner that the element is progressively drawn around said member as wear of the mechanism takes place.

Also according to the invention an automatic adjusting device comprises a member movable in one direction to operate a brake, clutch or like mechanism, spring means to move said member a restricted distance in the opposite direction, a deformable metallic element linking said member with said spring means, said element having a portion bent or looped around a part of either said member or said spring means, wherein said element is progressively drawn around said part when said member is moved in a mechanism-operating direction in excess of said restricted distance.

Preferably the deformable metallic element is a wire of predetermined gauge and tensile strength which has a portion substantially midway of its length looped around a pin or the like which is secured to the pressure plate of the brake or like mechanism. Both its legs are then continued parallel to each other for an appropriate distance and are then bent in opposite directions around a part-cylindrical member associated with the spring means. The free ends of each leg are then brought back towards the first loop and extend parallel to, and adjacent, the parallel legs between the first and second loops, thus forming an elongated loop.

The loop is associated with the pressure plate and spring means in such a manner that, in order fully to apply the brake when wear has taken place, the element is lengthened by the bent or looped portions being drawn towards the free ends of the wire, and the linear distance between the loops being correspondingly increased. The wire may be formed into an element of elongated shape having substantially parallel sides and arcuate ends, the loop portions being associated with curved surfaces associated, respectively, with the pressure plate and spring means, and the two free ends of the wire extending adjacent the parallel sides.

In other forms of the invention the free ends of the wire, instead of being looped towards each other are looped in the opposite sense, i.e., away from each other, and the free ends outwardly of the loops thus formed may be brought back in parallel alignment with the intermediate parallel portions of wire, or may be turned outwardly or inwardly at right-angles thereto. In any event, these free ends are associated with an arcuate-surfaced stop or stops over which the free ends may be drawn and distorted. The elements may, however, comprise one arm, only, in which case a suitable enlargement or projection is formed at one end to secure it to the appropriate brake portion.

Figure 3:
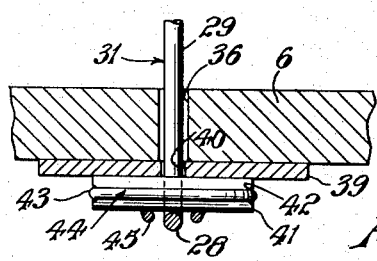
Figure 4:
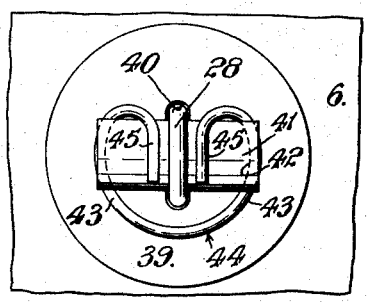

Various embodiments of the invention are illustrated in the accompanying drawings, to which reference is made in the following description. Of the drawings, Figure 1 is a section of a multi-disc brake showing one form of the automatic adjusting device of the present invention applied thereto, Figure 2 is a section, on an enlarged scale, of the automatic adjustment device shown in Figure 1, Figure 3 is a section taken on the line 3—3 of Figure 2, Figure 4 is a plan view taken in the direction of the arrow A of Figure 2, and Figures 5 to 8 are perspective, part-sectional views of further separate embodiments of the invention.

The embodiment of the invention illustrated in Figures 1 to 4 is shown as being applied to an aircraft multi-disc brake of known type comprising a pair of axially-spaced annular discs 1 rotatably secured to the hub 2 of a landing wheel, axially-movable non-rotatable friction pads 3 on each side of each disc 1 frictionally to engage the braking surfaces thereof, a non-rotatable torque plate 4 and a hydraulically-operated piston and cylinder mechanism 5 associated with said torque plate 4 and acting through a pressure plate 6 to force the assembly of friction pads 3 and discs 1 together in frictional engagement. However, it should be understood that the invention is equally applicable to disc brakes of other known types and the reference to the particular brake shown in Figure 1 is for illustrative purposes only.

The section shown in Fig. 1 is a diagrammatic section of a brake having three sets of cylinder and piston elements spaced 120° apart and having automatically adjustable retraction elements one between each pair of cylinder and piston elements. Consequently, the section is taken through one of the cylinder and piston elements and one of the adjustable retraction elements.

Figure 2:
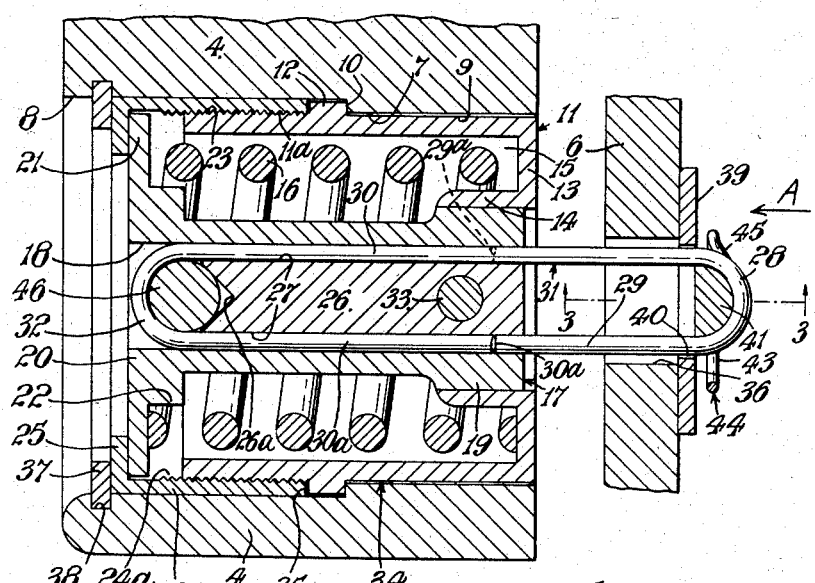

A cylindrical bore 7, Fig. 2, is provided in the torque plate 4 for each retraction element, each bore having two co-axial portions 8 and 9 of different diameters, with the smaller diameter portion 9 lying in the side of the torque plate adjacent the pressure plate 6. An annular step 10 is thus formed and this lies substantially axially midway of the bore 7. A spring-retaining sleeve 11, having a diameter generally such that it will slide in the bore portion 9, but having an outwardly-extending annular flange 12 of a diameter such that it will slide only in the bore portion 8, is passed into the bore 7 so that the flange 12 thereon abuts the step 10.

That portion of the sleeve 11 lying in the portion 8 of the bore 7 has a screw thread 11a formed on the outer periphery thereof, the screw thread extending from the flange 12 to the end of the sleeve.

The length of the sleeve 11 is such that with the flange 12 and step 10 in abutment the axially-outer end of the sleeve 11 is in alignment with the surface of the torque plate 4 adjacent the pressure plate 6, whilst the opposite end of the sleeve lies substantially axially-midway in the bore portion 8. The sleeve 11 at its axially-outer end is provided with an annular radially-inwardly extending flange 13 and on the inner periphery of this flange 13 is formed an annular axially-inwardly extending cylindrical portion 14 which extends axially inwardly to a position substantially midway of the bore portion 9. A re-entrant recess 15 is thus formed by the portions 11, 13 and 14, and this recess, which is of sufficient radial width to receive the end of a helical compression spring 16, thus acts as a spring-retaining cup and, by reason of the co-operation of the flange 12 and step 10, as an abutment for one end of the spring 16.

A further sleeve 17, having an axial passage 18 formed centrally therethrough has an annular radially-outwardly directed thickened portion 19 formed at one end thereof, and this portion is adapted to be received in the passage formed by the radially-inner periphery of the axially-inwardly directed cylindrical portion 14 of the sleeve 11.

The other end of the sleeve 17 is formed with an annular radially-outwardly directed stepped flange 20, the axially-outermost flange portion 21 being of greater radial width than the adjacent inner portion 22 thereof. The inner portion 22 of the flange 20 serves to locate the adjacent end of the spring 16, whilst the outer portion 21 acts as an abutment for said spring and also serves to retain the spring in compression as will be seen hereunder.

Association of the sleeve 11 and flange 12 in the bore portion 8 leaves an annular pocket 23 between the threaded portion 11a of the sleeve 11 and the adjacent peripheral wall of the bore portion 8, and into this pocket is screwed a sleeve 24 having a screw thread 24a formed in its inner periphery to mate with the screw thread 11a on the sleeve 11. The sleeve 24 is formed at its axially-outer end with an annular radially-inwardly directed flange 25 of such radial width that it overlaps the flange portion 21 of the flange 20 of the sleeve 17. The axial length of the sleeve 24 is such that when it is screwed into engagement with the thread 11a in the pocket 23 and into abutment with the adjacent side of the flange 12, its other end lies short of the outer end of the bore portion 8.

A substantially-cylindrical block 26 having a diameter very slightly less than the passage 18 in the sleeve 17, in which it is slidable, is formed on diametrically-opposite sides thereof with longitudinal flat portions 27, extending to the periphery of the block as a chord thereof, and being of a radial depth sufficient to permit two adjacent lengths of the wire 29, 30 to slide between the surface of each flat 27 and the wall of the passage 18.

A cylindrical member 46 is located loosely in a V-shaped groove 26a formed in one end of the block 26.

The adjustable element 31 comprises a length of wire formed with a loop 28 midway of its length, the two free ends of wire 29 and 30 being then extended parallel to each other, on the diameter of the loop 28, for the required distance and then being bent towards each other to form a second loop 32 of the same radius as the loop 28. The free ends of the wire are then carried back towards the loop 28 parallel, and adjacent, to the intermediate sections or limbs 29, 30 of the element, the free end 29a lying adjacent the limb 30, and vice versa.

The block 26 is passed between the limbs 29 and 30 of the element 31 and the cylindrical member 46 is inserted in the groove 26a so that the member 46, which has a diameter slightly smaller than the internal diameter of the loop 32, fits snugly in the loop. The block 26 and associated element 31 are then passed into the bore 18 of the sleeve 17 from the end 19 thereof until the outer periphery of the loop 32 lies slightly axially-inwardly of the outer radial surface of the flange 21, and are secured in place therein by a pin 33 passed diametrically through aligned holes in the sleeve 17 and block 26.

This portion of the device may be assembled as a unit 34 for subsequent insertion in the bore 7, and in this stage, the helical compression spring 16 is passed into the sleeve 11 so that one end enters the recess 15, and the sleeve 17 and associated element 31 are then passed within the other end of the spring 16 so that the thickened portion 19 of the sleeve enters within the inner periphery of the cylindrical portion 14, the flange 22 enters within the free coils of the spring 16, and the flange 21 engages the adjacent end of said spring. The sleeve 24 is then screwed over the sleeve 17 and spring 16 until its end 35 engages the adjacent side of the flange 12, the inner periphery of the flange 25 of the sleeve 24 overlapping and abutting the outer periphery of the flange 21 of the sleeve 17. The spring 16 is thus retained under partial compression between the flange 13 of the sleeve 11, at the one end, and the flange 21 of the sleeve 24 at the other end, and a portion of the element 31 including the loop 28, extends axially-outwardly of the sleeve 17.

If desired, the flange 25 of the sleeve 24 may be a complete disc, in which case the sleeve 24 will also act as a dust-excluding cap.

The pressure plate 6 (Figures 2, 3 and 4) has formed therein, axially opposite the center of the bore 7, a slot-like passage 36 the dimensions of which are slightly greater than the transverse width and depth of the element 31.

The unit 34 is inserted in the bore 7 so that the flange 12 abuts the step 10 and the free end, and the loop 28 of the element 31, pass through the passage 36 in the pressure plate 6. The unit 34 is held in the bore 7, by a circular spring clip 37 engaging in an annular groove 38 in the end of the bore 7 remote from the pressure plate 6, said spring clip 37 abutting the adjacent radial face of the flange 25.

The element 31 is passed through the slot 36 in the pressure plate 6 so that the loop 28 and an adjacent portion of the limbs 29, 30 of the element 31 protrude from the slot past the outer face (in relation to the unit 34) of the pressure plate, and a plate washer 39, having a central slot 40 in which the element 31 is a sliding fit, is passed over the protruding end of the element 31 into abutment with the adjacent face of the pressure plate 6.

An anchor pin 41 of substantially semi-circular section, and having one flat face to abut the washer 39 and an opposed part-circular face to engage snugly upon the inner periphery of the loop 28, is passed through said loop and across the slot 40 of the washer 39, thereby to anchor the element to the pressure plate 6.

The anchor pin 41 has formed in the radial face at each end thereof, a groove 42 which lies parallel with the flat surface of the pin, and into this groove 42 are placed the diametrically-opposed arcuate arms 43 of a circular spring clip 44. The spring clip comprises a substantially circular portion comprising the two arcuate arms 43, the free ends of which are turned back on a short radius to form short parallel arms 45. With the arms 43 engaged in the grooves 42, the short arms 45 are passed over the periphery of the cylindrical face of the pin 41 closely adjacent each side of the loop 28, and the pin 41 and element 31 are accordingly substantially locked together by the spring clip 44.

On operating the brake by pressurising the hydraulic piston and cylinder 5 the pressure plate 6 is moved to effect frictional engagement between the discs 1 and the friction pads 3 in the known way. Movement of the pressure plate 6, acting through the wire element 31 draws the sleeve 17 in the same direction, the sleeve 17 sliding upon the inner periphery of the flange 14. This movement of the sleeve 17 compresses the spring 16 until the brake is fully engaged or until the axially-inner face of the flange 21 abuts the adjacent end of the sleeve 11, which latter is prevented from movement by the flange 12 and step 10. If the flange 21 and sleeve 11 come into abutment before the brake is applied, due, e.g. to wear of the friction pads 3, the element 31 is deformed by the operating pressure, the two free ends of the arms 29, 30 of the element 31 being pulled in opposite directions around the cylindrical peg 46 on the end of the block 26 to increase the linear distance between the opposed loops 28 and 32 at opposite ends of the element by the amount necessary to allow the brakes to be fully applied.

On removing the braking pressure the spring 16 moves the sleeve 17 back to its original position with the flanges 21 and 27 in abutment, and in this position the pressure plate 6, owing to the increased length of the element 31 which occurred in taking up the wear on the previous application of the brakes, has been drawn away from the disc 1 only by the amount necessary to maintain the friction pads 3 at their predetermined distance from the disc 1 to provide a necessary and constant running clearance between the pads 3 and the discs 1.

Thus, as the friction pads 3 wear through application of the brake, so the wire element 31 operatively connecting the retractor spring 16 with the pressure plate 6 progressively lengthens to compensate for this wear and, with the brake disengaged, the friction pads 3 are retracted a predetermined and constant distance from the disc 1.

The lengthening of the element 31 is effected by the braking pressure, in effect, deforming the wire of the element and, as it were, progressively moving the loop 32 closer to the free ends 29a, 30a of the wire, thus increasing the linear distance between the loops 28 and 32 and increasing the length of the intermediate portions of the arms 29 and 30 lying between the pin 41 and the member 30a. Little friction is involved in this process, the force involved in distorting the wire being essentially related entirely to the gauge and tensile strength of the wire. Thus little greater effort is required to apply brakes fitted with an automatic adjustment of this type, during a period when such adjustment is taking place, than in the normal application thereof.

Figure 5:
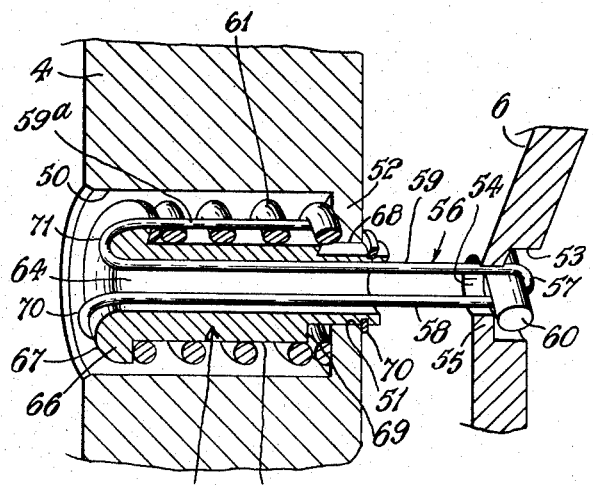

In a further embodiment of the invention as shown in Figure 5, a deep recess 50 is formed in the torque plate 4 on the side thereof remote from the pressure plate 6, and a hole 51 is formed through said torque plate 4, the recess 50 and hole 51 forming, in association, a radially-inwardly directed annular flange 52 on the face of the torque plate 4 adjacent the pressure plate. Similarly in the pressure plate 6, co-axially of the hole 51, a recess 53 and co-axial hole 54 are formed to provide a recess 53 having a radially-inwardly directed annular flange 55 on the side thereof adjacent the torque plate 4.

A wire element 56 has a loop 57 formed midway of its length, and the free ends of the wire are extended parallel with each as arms 58, 59.

The loop 57 is passed through the hole 54 in the pressure plate 6 from the side thereof adjacent the torque plate 4 and a cylindrical peg 60 is passed inside the loop 57 so that the peg 60 abuts the inner radial face of the flange 55 and anchors the loop 57 in the recess 53 and so secures the element 56 to the pressure plate 6.

A helical compression spring 61 is passed into the recess 50 in the torque plate 4 so that it abuts the inner radial face of the flange 52, and a cylindrical sleeve 63 is passed within the spring 61 from the free end thereof.

The sleeve 63 has a passage 64 formed axially therethrough, and the major portion 65 of the diameter of its outer periphery is a sliding fit within the spring 61. At its axially-outer end it is formed with a radially-outwardly directed annular flange 66, the axially-inner radial face of which is adapted to abut the adjacent end of the spring 61. The axially-outer end of the sleeve 63 and flange 66 is formed as a part-circular-surfaced annulus 67.

The inner axial end of the sleeve 63 is reduced in diameter to form a spigot 68 which is slidable in the hole 51 and which extends axially outwards for a short distance from said torque plate 4. The spigot 68 is continued for a predetermined distance axially-inwardly of the flange 52 and joins said larger diameter portion 65 in a step 69.

The sleeve 63 is passed within the spring 61 and the spring is compressed so that the spigot 68 protrudes from the hole 51, and the spring is locked under partial compression by a circular spring clip 70, engaging in an annular groove on the spigot and abutting the adjacent face of the flange 52.

With the pressure plate 6 and torque plate 4 spaced-apart by a predetermined distance the arms 58 and 59 of the element 56 are passed through the passage 64 and are then each turned outwardly over the part-circular annulus 67 to form the loop 70, 71, and the free ends of the arms 58, 59 are then turned back longitudinally to lie alongside the outer periphery of the spring and axially thereof.

In a similar manner to the previous embodiment of the invention, normal operation of the pressure plate 6 to apply the friction pads 3 to the discs 1 of the brake will compress the spring 61 and move the spigot 68 axially in the hole 51. If, through wear of the friction pads 3, the step 69 abuts the adjacent radial face of the flange 52 before the brake is fully applied, the pressure will cause the arms 58, 59 of the element 56 to be lengthened by drawing the loops 70, 71 over the surface 67 of the sleeve 63 and thus causing lengthening of the arms 58, 59 by an amount equal to the additional movement of the pressure plate 6 brought about by wear of the friction pads 3.

Figure 6:
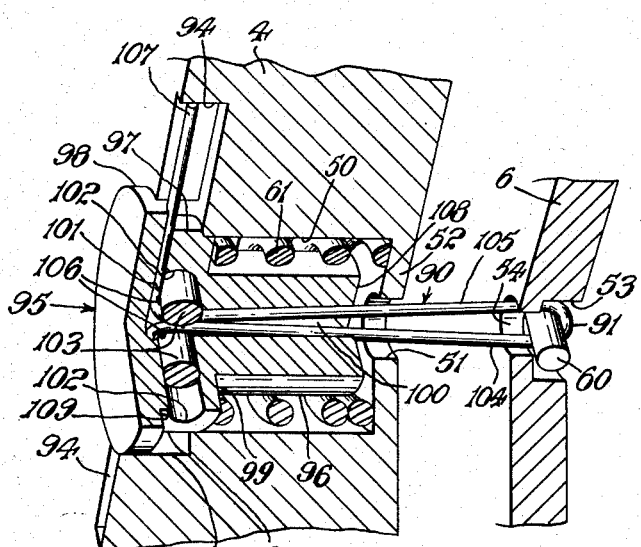

In a further embodiment of the invention as shown in Figure 6 of the drawings, a wire element 90 is formed with a loop 91 which is passed through the hole 54 in the pressure plate 6 and is held in the recess 53 by an anchor pin 60 passed through a loop 91 formed in the element 90.

The recess 50 formed in the torque plate 4 has a radial flange 52 at the end thereof adjacent the pressure plate 6, and a hole 51 is formed through the flange co-axially with the recesses 50 and 53.

The recess 50 is formed to a larger diameter 92 adjacent the axially-outer end thereof, an annular step 93 being formed at the junction of the two diameters. Two diametrically-opposed recesses 94 extend radially-outwardly from said larger diameter portion 92 and are axially co-extensive therewith. The axially inner faces of these recesses 94, i.e., the bottoms thereof, are hollowed out to a depth equal to the gauge of the wire of the element 90.

A helical compression spring is passed into the recess 50 into abutment with the flange 52, and a cylindrical member 95, formed with three concentric diameters 96, 97, 98 is entered into the centre of the spring so that the smaller diameter portion 96 is slidable therein, and the spring 61 abuts a step 99 formed at the junction of the smaller diameter portion 96 and the intermediate portion 97. The larger diameter portion 98 is slidable axially in the larger diameter portion 92 of the recess 50.

The smaller and intermediate diameter portions 96, 97, of the member 95 are formed with an axial slit 100 which passes diametrically across the axis of the member 95 and extends axially thereof to a point adjacent the larger diameter portion 98. The slit 100 is of such width that the wire of the element 90 may be passed therethrough.

Formed chordally through the intermediate diameter portion 97, and axially offset from the adjacent end of the slot 100 so that the wire of the element 90 will slide through the space 101 so provided, are two holes 102 in which are adapted to rotate two cylindrical pins 103.

From the loop 91 of the element 90, the two arms 104, 105 gradually converge until they reach the pins 103, when they are formed into loops 106 over the pins 103, the free end 107 of the wires being extended diametrically outwards to lie in the recesses 94.

As in all embodiments of the invention, the element 90 is preferably pre-formed, and in the assembly of the present embodiment the element is located in the torque member 4 prior to being anchored in the pressure plate 6.

The pins 103 are moved clear of the slot 100 and the arms 107 of the pre-formed element 90 are passed along the slot 100 until they abut the end thereof. The pins 103 are then passed inside the loops 106 so that the arms 107 pass through the spaces 101. The arms 107 are located in the recesses 94 and the member 95 is passed inside the spring so that the loop 91 passes through the hole 53, the spring 61 is compressed and the pressure plate 6 moved towards the torque plate 4 and the pin 60 engaged in the loop 91. The spring 61 is then allowed to resume its normal partial compression.

Operation of the brake as previously disclosed will cause the element 90 to draw the member 95 inwards of the recess 50 until the brake is engaged or the end 108 engages the adjacent face of the flange 52. In the latter event the arms 104, 105 will draw the loops 106 over the pins 103 to lengthen said arms by deforming the wire and shortening the free ends 107 relative to the arms 104, 105.

The position of the ends of the wire, comprising the free ends 107, in the recesses 94 forms a visual indication of the amount of wear that has taken place in the brake friction pads 3.

The larger diameter portion 98 of the member 95 is axially slidable in the portion 92 of the recess 50, and abutment of the step 109, formed at the junction of the portions 97 and 98, with the step 93 may be used as the abutment for adjusting the element 90 in lieu of the abutment of the flange 52 and the end 108 of the member 95. In this case, the arms 107 pass into the hollowed-out bases of the recesses 94 so that the steps 109 and 93 may fully abut.

Figure 7:
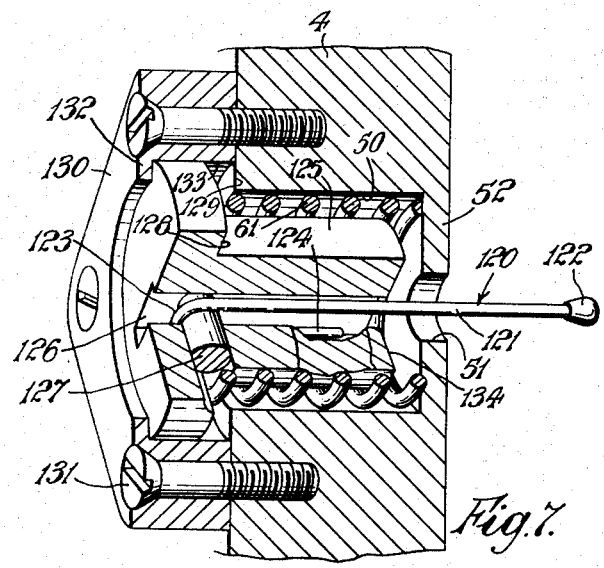
Figure 6:
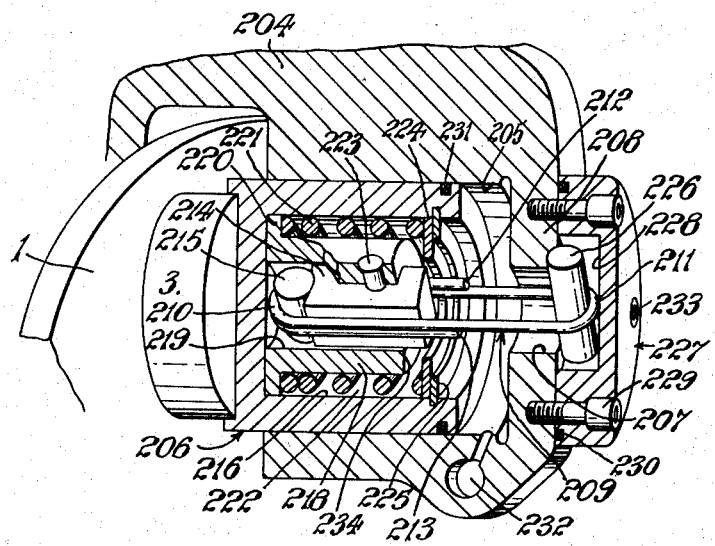

In Figure 7 an embodiment of the invention is shown wherein the wire element 120 comprises only a single arm 121 of wire having an enlarged portion 122 which is suitably secured in the pressure plate of the brake, and a loop 123 at its other end 124, which is turned back parallel, and adjacent, to the arm 121. The loop 123 is passed axially of a flanged cylindrical block 125, through a rectangular passage 126 extending radially and axially thereof. A cylindrical pin 127 is passed diametrically across the passage 126 inside the loop 123. A spring 61 is passed into the recess 50 in the torque member 4, until it engages the flange 52, as in the previous embodiment of the invention. The cylindrical block 125 and element 120 are passed inside the spring 61, the enlargement 122 and portion of the arm 121 protruding through the hole 51. The annular flange 128 of the block 125 is of greater diameter than the recess 50, so that on compression of the spring 61 the flange 128 engages the face 129 of the torque member 4. The device is held in the recess 50, with the spring 61 in partial compression, by a plate 130 secured in the torque member 4 as by screws 131, and the outer radial face of the block 125 engages an inwardly-directed annular flange 132 in a recess 133 in the plate 130.

With the enlargement 122 suitably secured in a brake pressure plate, normal operation of the brake will move the block 125 axially in the recess 50. If excessive movement is necessary due to wear of the brake pressure pads the block 125 will either abut the face 129 of the torque member 4 with the face 128 of its flange, or the flange 52 of the recess 50 with the adjacent end 134 of the block 125 and the loop 123 will be drawn over the pin 127 to lengthen the arm 121 of the element 120.

The invention may, with little modification, be associated directly with the fluid-pressure operated piston and cylinder mechanisms of a brake, and in Figure 8 such an association is illustrated, the adjusting device used in this case being substantially the same as that described in relation to Figure 2 of the drawings.

In this embodiment of the invention, the torque member 204 has formed therein a cylindrical recess 205 which extends axially inwards from the face of the torque member 204 adjacent the rotating disc 1 of the brake. Conveniently the torque member 204 may be the caliper arm of a brake of the type having a caliper which straddles a portion of the periphery of a brake disc such, for instance, as is more fully described in Patent 2,790,516.

The pressure plate 6 of the previous embodiments of the invention is omitted, and the brake friction pad 3 is secured in a circular recess in the end of a blind-ended annular piston 206 which is slidably received in said cylindrical recess 205, which comprises the cylinder of a fluid pressure operated piston and cylinder mechanism for pressing the friction pad 3 against the adjacent radial face of the rotating disc 1, and will be referred to as the "cylinder" hereunder.

At the axial end of the cylinder 205 remote from the disc 1, a hole 207 is bored through the member 204 co-axially of the cylinder, and a radial annular flange 208 is formed thereby, which extends radially inwardly of the bore of said cylinder.

A wire element 209, of substantially identical construction to that disclosed in relation to Figure 2, has opposed loops 210, 211, the free ends 212, 213 of the wire being turned back at the loop 210 to lie parallel with, and adjacent, the parallel arms intermediate said loops.

A cylindrical block 214, having diametrically-opposed flat sides upon which the respective parallel arms of the element 209 are adapted to rest, has a V-shaped recess formed in one radial face thereof, and a cylindrical pin 215 is adapted to rest loosely in this recess. This block 214, with the pin 215 received in its groove, is passed between the parallel spaced arms of the element 209 so that the pin 215 engages the inner periphery of the loop 210.

The piston 206 has an annular recess 216 formed co-axially therein through most of its length, leaving a wall 217 to which the friction disc 3 is secured, and a sleeve 218, having a central passage 219 into which said block 214 and the associated portions of the element 209 may be passed, has an annular radially-outwardly extending flange 220 which is freely slidable in the recess 216 of the piston 206. The flange 220 is of a radial width sufficient to permit a helical compression spring 221 to be passed into the annular pocket 222 defined by the inner periphery of the recess 216 and the outer periphery of the sleeve 218.

The block 214, pin 215 and associated portions of the element 209 are passed into the bore 219 of the sleeve 218 until the outer periphery of the loop 210 lies very slightly inwardly of the radial face of the flange 220, and the block 214 is secured in the sleeve 218 by a pin 223 passed diametrically through the block 214 and through diametrically-opposed holes in the wall of the sleeve 218.

The sleeve 218, and associated block 214, are then passed as a unit into the recess 216 until the flange 220 abuts the blank end of the recess, and the spring 221 is passed into the pocket 222 between the sleeve 218 and the inner periphery of the recess 216 until its end abuts the adjacent radial face of the flange 220. A plate washer 224 is passed inside the recess 216 onto the adjacent end of the spring 221 and the spring is partly compressed and locked under this compression by a circular spring clip 225 engaging in a suitable groove formed in the peripheral wall of the recess 216 and abutting the plate washer 224. The piston 206 is then passed into the cylinder 205 so that the friction pad 3 portrudes therefrom, and the loop 211 of the element 209, is passed through the hole 207 and anchored on the outer face of the member 204 as by a cylindrical pin 226 passed through the inside of the loop 211.

A cap 227, having a recess 228 therein to receive the pin 226 and loop 211, is fluid-tightly secured to the member 204 outwards of the hole 207, as by screws 229, an annular resilient pressure seal 230 being provided between the abutting surfaces of the member 204 and the cap 227.

The piston 206, which has an annular pressure seal 231 located in an annular groove formed in its outer periphery, is slidable in said cylinder 205 by pressure fluid which is directed to the interior of the cylinder 205, behind the piston 206, through a pressure fluid conduit 232, upon actuation of fluid pressure operated brake-applying means of known type. An air-bleeding screw 233 is provided in the cap 227 for the removal of any air that may be entrapped within the cylinder.

Upon the admission of pressure fluid to the cylinder 205 through the conduit 232, the piston 206 is forced axially outward of the cylinder 205, compressing the spring 221 by reason of the restraint imposed by the element 209.

If the distance between the friction pad 3 and the rotating disc 1 is of the normal order, the pad 3 frictionally engages the disc 1 and decelerates its rotation. If, however, wear has taken place and the distance between the pad 3 and disc 1 exceeds the normal amount, the end 234 of the sleeve 218 abuts the plate washer 224, preventing further compression of the spring 221, and the element 209 takes over the full load of the fluid pressure. The element is thus deformed by drawing the loops 210 over the pin 215, and increasing the distance between the loops 210, 211 and the pad 3 is pressed against the disc 1.

Upon release of the fluid pressure from the cylinder 205 the spring 221 retracts the pad 3 away from the disc 1 only by the amount of travel permitted the sleeve 218 in the recess 216, the amount of wear having been automatically compensated by the deformation of the element 209.

Throughout the foregoing description of the several embodiments of the invention, specific reference has been made to means for anchoring the non-deformable end of the wire element. These specific means have been described for the purposes of the disclosure, only, and should not be construed as being limitative of the scope of the invention. It will be clear to the person skilled in the art that the precise means used for anchoring the wire element will depend largely upon the type of brake in which the device is to be incorporated and appropriate modifications of the anchorage may be necessary to suit particular circumstances.

The anchoring means per se for the non-deformable end of the wire element form no part of the present invention and are subject to such modifications as the particular circumstances encountered may demand.

The reference to pressure fluid herein should be construed in its broadest term as comprising both gaseous and liquid fluid.

The device per se has been found to be particularly advantageous when applied to the brakes of aircraft which normally operate at high altitudes. The fluid systems of such aircraft are normally arranged to have a constant residual pressure, which may be as high as 50 p.s.i., and this could mean a constant braking force which has to be overcome. It has been found that the device of the present invention is sufficiently robust, in conjunction with a return spring rated to exert a force in excess of this opposed residual pressure, to disengage the pads 3 and discs 1 when the brake is idle and, at the same time, is sufficiently sensitive to provide the requisite compensation for brake pad wear. In other words, the link is sufficiently robust to draw away the pressure plate 6 from the disc 1, under action of the return spring against a residual pressure head of the order of 50 p.s.i., and yet is sufficiently ductile to distort when necessary, under the comparatively small additional pressure necessary to apply the brakes.

The characteristics of the present device are variable, to suit particular circumstances, by variations in the gauge and tensile strength of the wire employed in making the link. The wire need not necessarily be circular in cross-section, but may be of any convenient section, or may be a metal strip.

The invention is not only applicable to aircraft brakes, but is readily adaptable for use with any type of brake, clutch or other mechanism requiring a similar type of automatic adjustment.

Where the invention is applied to a brake, such brake need not necessarily be of the type herein referred to and illustrated in the drawings, such specific form of brake having been shown as a typical aircraft brake of known form, but the invention is nowise being limited thereto.

Having now described my invention, what I claim is:

1. An automatically adjustable brake mechanism which comprises a friction member, a rotatable member to be engaged by said friction member, a torque element means supported by said torque element to move said friction member into engagement with said rotatable member, a retraction member supported by said torque element and having a spring to withdraw said friction member from engagement with said rotatable member, stops to limit the expansion and compression of said spring to a limited distance and an anchoring surface and an automatic adjustment element comprising an elongated, ductile, metallic, element anchored to said friction member and extending to and bent about said anchoring surface of said retraction member to be drawn about said anchoring surface as said friction member is moved progressively from said retraction member upon movement of said friction member by said means to progressive distances from said torque element.

2. The brake mechanism of claim 1 in which said retraction member comprises a non-movable element having a pair of stops spaced in the directcion of movement of said friction member and an element carrying the anchoring surface movable in the direction of movement of said friction member and a spring between said fixed and movable elements biasing said movable element away from said friction element, said elongated, ductile, metallic, element serving to space said friction member progressively from said movable element as said friction member wears.

3. A device according to claim 2 wherein said spring means is adapted to be located in a recess in said non-movable member, an annular bush in said movable member, said spring being a helical compression spring, said bush being urged by said spring against one of said stops on said non-movable member.

4. A device according to claim 3 comprising a second annular bush slidably inserted within the first-named said annular bush and having a radial annular projection thereon adapted to engage the end of said spring remote from the end thereof engaged by said first-named annular bush.

5. A device according to claim 4 wherein said ductile metallic element is located in the inner axial passage of said second-named annular bush.

6. A device according to claim 5 wherein said ductile metallic element comprises an elongated closed loop formed from a length of ductile metal, said closed loop comprising a single arcuate bend at one end thereof, a pair of opposed straight, parallel, sides and a double arcuate bend at the other end thereof, said double arcuate bend being formed by bending the metal comprising a continuation of said parallel sides in opposite directions towards each other and in parallel and co-axial relation, the free ends of said metal being directed back toward the first-named said arcuate bend adjacent to, and parallel with the opposite straight sides of said closed loop.

7. A device according to claim 6 comprising a cylindrical pin disposed axially within said double arcuate bend, and a further substantially cylindrical pin disposed between the parallel sides of said loop, parallel therewith and with one end thereof in abutment with the first-named said cylindrical pin, said double arcuate bend and said cylindrical pins being secured against axial movement in the axial passage in said second-named annular bush.

8. A device according to claim 7 comprising mutually engageable abutments on said first-named and said second-named annular bush, the abutment on said second-named annular bush being normally spring urged away from the abutment on said first-named annular bush for a distance defining said restricted distance.

9. A device according to claim 8 wherein said non-movable member comprises the torque member of a disc brake and said movable member comprises a pressure means having secured thereto a friction element.

10. A device according to claim 9 wherein said single arcuate bend of said ductile metallic element is secured to said movable member.

11. A device according to claim 9 wherein the end of said first-named annular bush adjacent said double arcuate loop is closed and has a friction element secured thereto, said single arcuate bend being secured to said non-movable member and said first-named annular bush being adapted to be forced outwardly of said recess by fluid-pressure directed into the open end thereof, said first-named annular bush this comprising said movable member.

12. A device according to claim 3 wherein said stops comprise a radial annular flange in the base of said recess, a portion of said annular bush being slidable within the inner periphery of said flange, an abutment on said annular bush on each side of said flange and an outwardly directed radial flange on the end of said bush remote from the base of said recess, said outwardly directed radial flange being adapted to hold said spring in compression against the base of said recess whereby to urge one said abutment on said bush into engagement with said annular flange in said recess, said annular flange comprising said abutment on said non-movable member.

13. A device according to claim 12 wherein said abutments on said annular bush are axially-spaced thereon whereby said bush is adapted to be axially slidable in said recess through said restricted distance defined by the axial separation of said abutments.

14. A device according to claim 13 wherein said outwardly directed radial flange on said annular bush comprises the portion of said spring means about which said ductile metallic element is bent.

15. A device according to claim 14 wherein said ductile metallic element comprises a length of ductile metal having at one end thereof an arcuate loop adapted to be engaged with an abutment on said axially movable member, said element further comprising two elongated parallel arms adapted to be passed axially through the axial passage of said annular bush, said arms being turned back, in opposite directions, away from each other, around the outside of the outwardly directed radial flange on said annular bush so that the free ends extend parallel to said elongated parallel arms towards said arcuate loop adjacent, and parallel with, the outer periphery of said spring.

16. A device according to claim 3 wherein said spring means is adapted to be located in a recess in a non-movable member associated with said movable member and comprises a helical compression spring and a cylindrical block having a portion thereof located within the inner periphery of the helix of said spring and a radial flange adapted to engage the adjacent end of said spring, a further outwardly directed radial flange co-axial with the first-named said radial flange and adapted to engage the outer surface of said non-movable member upon axial movement of said block through a restricted distance to compress said spring, said block having an axial passage formed therein co-axially of its periphery and extending for a substantial distance axially therewithin and a radial passage formed through said block and communicating with said axial passage, said ductile metallic element being adapted to be passed axially through said axial passage and then radially through said radial passage.

17. A device according to claim 16 wherein the end of the said block located within the helix of said spring is normally spaced apart from the base of said recess by an amount defining said restricted distance.

18. A device according to claim 17 wherein said ductile metallic element comprises a length of ductile metal having an arcuate loop formed therein and adapted to be engaged with an abutment on said axially movable member, said element further comprising two straight converging elongated arms adapted to be passed axially into said axial passage in said block, each said arm being turned radially outward substantially at right angles to each said converging arm, and each said outwardly turned arm being passed radially outward in opposite directions through a pair of said radial passages formed through said block in diametrical alignment.

19. A device according to claim 18 comprising a pair of radial recesses formed in the surface of said non-movable member adjacent, and in continuation of, each said radial passage, the free ends of said outwardly turned arms of said ductile metallic element being adapted to be located in the respective recesses whereby to provide visual means for determining the protruding length thereof.

20. A device according to claim 17 wherein said ductile metallic element comprises an elongated member of ductile metal having integral anchoring means formed at one end thereof and adapted to be engaged with said axially movable member, the axial passage in said block being extended completely therethrough and being of rectangular section, a cylindrical abutment located in said radial passage and extending across said axial passage, the end of said elongated ductile metallic member remote from said integral projection being passed along the axial passage in said block and then being bent around said cylindrical abutment, the free end of said ductile member then being passed back along said axial passage towards said projection parallel with the first portion of said ductile member.

21. An automatic adjusting device for a brake, clutch or like mechanism, comprising a fixed support, a pressure member movable toward and from said fixed support, pressure applying means to move said pressure member from said fixed support, a withdrawing member movable through a limited fixed range between said fixed support and said pressure member to draw said pressure member through said limited range toward said fixed support and an elongated metallic element connecting said withdrawing member to said pressure member and being fixed to one of said members and bent around a portion of the other member and being capable of being drawn progressively about said portion of said element about which it is bent upon relative axial movement between said members in excess of said limited distance to lengthen said connection between said members.

22. An automatic adjusting device for a brake, clutch or like mechanism comprising a pressure member axially movable in one direction to operate said mechanism, a spring member to move said pressure member a restricted distance in the opposite direction to disengage said mechanism, and a ductile metallic wire linking said members and having a portion thereof bent around one of said members to permit said bent portions to be drawn about said member to lengthen said linkage between said elements when said member is moved in said one direction for a distance in excess of said restricted distance of movement of said spring member.

References Cited in the file of this patent

UNITED STATES PATENTS

| | | |
|---|---|---|
| 2,196,396 | Lane | Apr. 9, 1940 |
| 2,295,758 | Safford | Sept. 15, 1942 |
| 2,743,790 | Bricker | May 1, 1956 |
| 2,830,680 | Hawley | Apr. 15, 1958 |